(12) United States Patent
Moyer et al.

(10) Patent No.: US 8,710,821 B2
(45) Date of Patent: Apr. 29, 2014

(54) METHOD FOR INHIBITING THERMAL RUN-AWAY

(75) Inventors: Ole P. Moyer, Chandler, AZ (US); Paul Jay Harriman, Belfair, WA (US); Benjamin M. Rice, Cumberland, RI (US); Christopher J. Gass, Tempe, AZ (US); Michael A. Stapleton, Scottsdale, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 427 days.

(21) Appl. No.: 12/837,382

(22) Filed: Jul. 15, 2010

(65) Prior Publication Data

US 2010/0277961 A1 Nov. 4, 2010

Related U.S. Application Data

(63) Continuation-in-part of application No. 11/424,844, filed on Jun. 16, 2006, now Pat. No. 7,759,918.

(51) Int. Cl.
*H02M 3/156* (2006.01)

(52) U.S. Cl.
USPC .......................................... 323/288; 323/285

(58) Field of Classification Search
USPC ........................... 323/223, 282, 283, 284, 285
See application file for complete search history.

(56) References Cited

U.S. PATENT DOCUMENTS

| | | | | |
|---|---|---|---|---|
| 4,672,518 A * | 6/1987 | Murdock | .................... | 363/21.04 |
| 5,745,352 A * | 4/1998 | Sandri et al. | ..................... | 363/41 |
| 5,917,313 A * | 6/1999 | Callahan, Jr. | .................. | 323/288 |
| 6,275,018 B1 * | 8/2001 | Telefus et al. | .................. | 323/282 |
| 6,278,263 B1 | 8/2001 | Walters et al. | ................. | 323/272 |
| 6,341,073 B1 * | 1/2002 | Lee | ............................. | 363/21.02 |
| 6,965,502 B2 | 11/2005 | Duffy et al. | ..................... | 361/18 |
| 7,023,188 B1 | 4/2006 | Rice | .............................. | 323/271 |
| 7,031,174 B2 | 4/2006 | Lipcsei | ........................... | 363/98 |
| 7,227,476 B1 * | 6/2007 | Wong | .............................. | 341/53 |
| 2003/0201761 A1 | 10/2003 | Harris | ........................... | 323/272 |
| 2005/0184717 A1 | 8/2005 | Walters | ......................... | 323/284 |
| 2006/0043948 A1 * | 3/2006 | Li et al. | ........................ | 323/282 |

OTHER PUBLICATIONS

2/3/4 Phase Buck Controller for VR10 and VR11 Pentium IV Processor Applications, Semiconductor Components Industries, LLC, Publication No. NCP5381, Rev. May 2, 2006. Retrieved from http://www.onsemi.com/pub/Collateral/NCP5381-D.PDF.

(Continued)

*Primary Examiner* — Gary L Laxton
(74) *Attorney, Agent, or Firm* — Rennie William Dover (57) ABSTRACT

A method for mitigating aliasing effects in a single phase power converter and mitigating aliasing effects and inhibiting thermal run-away in a multi-phase power converter at varying load transition rates. A single phase or multi-phase power converter having an on-time is provided and the frequency of the power converter is adjusted so that a load step period and the on time of the single phase power converter are in a temporal relationship. Alternatively, a load step rate is inhibited from locking onto a phase current of the single phase power converter by suspending an oscillator signal. In accordance with another alternative, a load step rate is inhibited from locking onto a phase current of the single phase power converter by suspending an oscillator signal and dithering an input signal to the oscillator.

5 Claims, 7 Drawing Sheets

(56) References Cited

OTHER PUBLICATIONS

MOSFET Driver with Dual Outputs for Synchronous Buck Converters, Semiconductor Components Industries, LLC, Publication No. NCP3418B, Rev. Mar. 5, 2006. Retrieved from http://www.onsemi.com/pub/Collateral/NCP3418B-D.PDF.

Dual Bootstrapped 12 V MOSFET Driver with Output Disable, Semiconductor Components Industries, LLC, Publication No. NCP3418, Rev. May 12, 2006. Retrieved from http://www.onsemi.com/pub/Collateral/NCP3418-D.PDF.

Dawson, Stephen, "What is Dither?" Ver. Aug. 21, 2003. Retrieved from http://www.hifi-writer.com/he/dydaudio/dither.htm.

* cited by examiner

METHOD FOR INHIBITING THERMAL RUN-AWAY

The present application is a continuation-in-part application of prior U.S. patent application Ser. No. 11/424,844 filed on Jun. 16, 2006 now U.S. Pat. No. 7,759,918, which is hereby incorporated herein by reference in its entirety, and priority thereto for common subject matter is hereby claimed.

BACKGROUND OF THE INVENTION

This invention relates, in general, to power converters and, more particularly, single phase and multi-phase power converters.

Power converters are used in a variety of electronic products including automotive, aviation, telecommunications, and consumer electronics. Power converters such as Direct Current to Direct Current ("DC-DC") converters have become widely used in portable electronic products such as laptop computers, personal digital assistants, pagers, cellular phones, etc., which are typically powered by batteries. DC-DC converters are capable of delivering multiple voltages from a single voltage independent of the load current being drawn from the converter or from any changes in the power supply feeding the converter. One type of DC-DC converter that is used in portable electronic applications is a buck converter. This converter, also referred to as a switched mode power supply, is capable of switching an input voltage from one voltage level to a lower voltage level. A buck converter is typically controlled by a controller that can be configured to be a multi-phase controller having a plurality of output current channels that switch at different times. The output currents flowing in the output current channels are summed and delivered to the load. An advantage of this configuration is that each channel conducts a portion of the total load current. For example, in a 4-phase buck controller, each channel conducts 25% of the output current. This lowers the power dissipated by each output. A drawback with a multi-phase buck controller is that when the currents are not balanced, one of the current channels will conduct more current than the other current channels, which could lead to thermal failure. Another drawback is that a dynamic load coupled to the controller may have the same repetition rate as one of the outputs of the multi-phase buck converter. In this case, the currents in the channels become unbalanced causing the converter to suffer thermal failure.

Accordingly, it would be advantageous to have a controller circuit and a method of operating the controller circuit that maintains a balanced current at its outputs. In addition, it is desirable for the controller circuit to be cost and time efficient to manufacture.

BRIEF DESCRIPTION OF THE DRAWINGS

The present invention will be better understood from a reading of the following detailed description, taken in conjunction with the accompanying drawing figures, in which like reference characters designate like elements, and in which.

DETAILED DESCRIPTION

Generally, the present invention provides a method for mitigating aliasing effects such as output voltage oscillation in a single phase power converter and mitigating aliasing effects and balancing current in a multi phase power converter at varying load transition duty cycles, periods, and rates. The single phase power converter or the multi-phase power converter comprises an oscillator or other ramp signal generator, a pulse width modulator, and at least one power stage. In accordance with one aspect of the present invention, the current is balanced by dithering an output signal of the oscillator or the ramp signal generator. It should be understood that dithering the output signal is defined as constantly varying the frequency of the oscillator output signal or the ramp signal. Dithering the oscillator output signal or the ramp signal keeps the load step and the switching frequency of the single phase power controller and the multi-phase power controller from matching for a significant period of time. By keeping the switching frequency and load step frequency from matching, voltage and current beat frequency effects in both single phase controllers and multi-phase power controllers are mitigated so that voltage output is steady in single phase controllers and in multi-phase controllers and currents are balanced between phases in a multi-phase controller to avoid thermal runaway.

In accordance with another aspect of the present invention, the current is balanced by suspending the oscillator output signal. This introduces a phase delay in the output signals so that the output signals are not synchronized to the load step rate.

In accordance with yet another aspect of the present invention, the current is balanced by dithering the oscillator output signal or the ramp signal and suspending the oscillator output signal.

Figure 1:
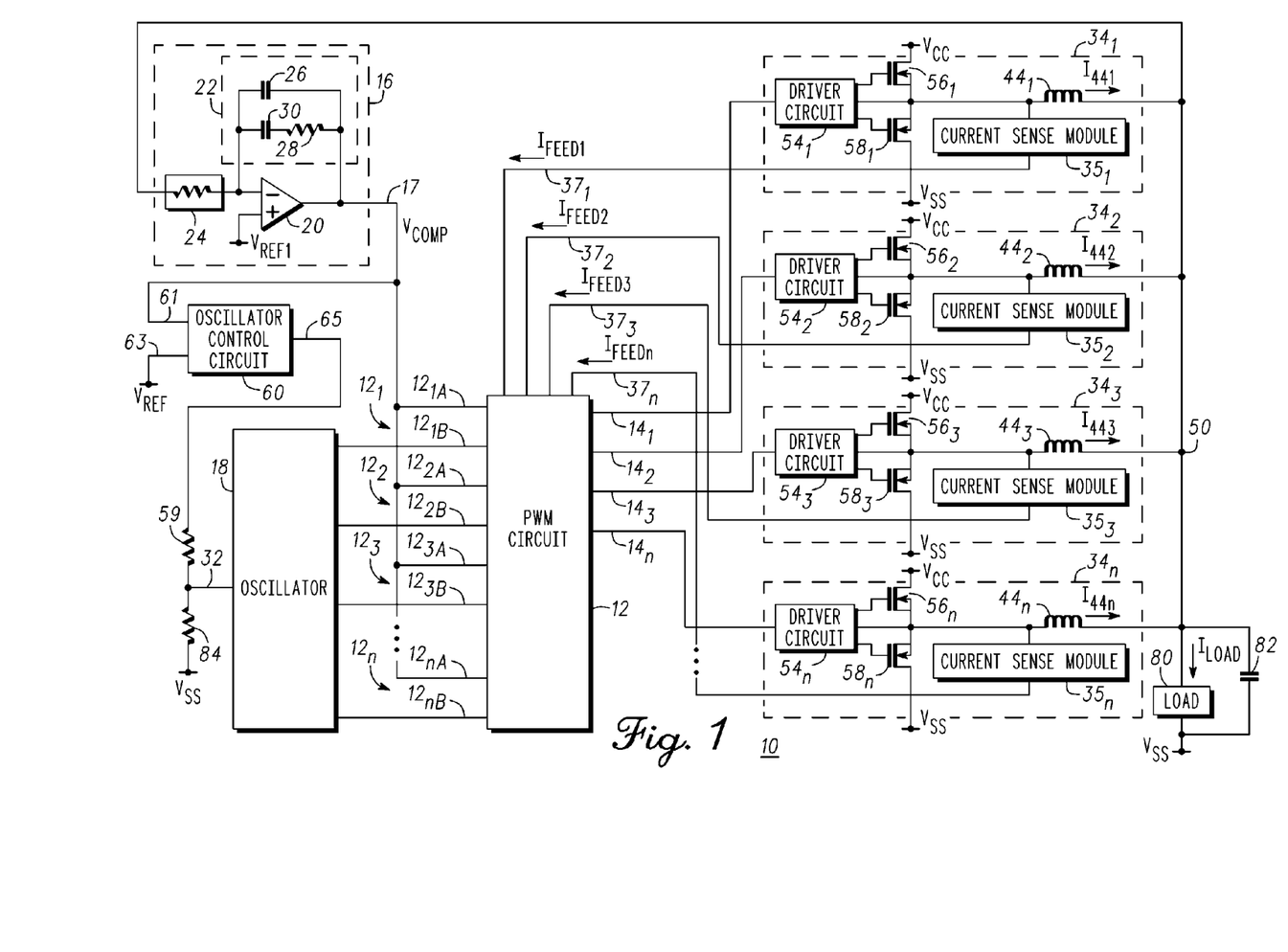
FIG. 1 is schematic diagram of a multi-phase controller circuit in accordance with an embodiment of the present invention.

FIG. 1 is a block diagram of a multi-phase power converter 10 manufactured in a semiconductor substrate in accordance with an embodiment of the present invention. What is shown in FIG. 1 is a Pulse Width Modulator ("PWM") circuit 12 having "n" sets of inputs $12_1, 12_2, 12_3, \ldots, 12_n$, where "n" is an integer. Each set of the "n" sets of inputs comprises an error input $12_{nA}$ and an oscillation input $12_{nB}$. It should be noted that the letters "A" and "B" are used in the reference characters to distinguish between error inputs and oscillation inputs, respectively. Thus, input $12_1$ comprises an error input $12_{1A}$ and an oscillation input $12_{1B}$; input $12_2$ comprises an error input $12_{2A}$ and an oscillation input $12_{2B}$; input $12_3$ comprises an error input $12_{3A}$ and an oscillation input $12_{3B}$; and input $12_n$ comprises an error input $12_{nA}$ and an oscillation input $12_{nB}$.

Multi-phase power converter 10 further includes an error amplifier 16 having an output 17 connected to error inputs $12_{1A}$, $12_{2A}$, $12_{3A}$, ..., $12_{nA}$ and an oscillator 18 having an input 32 and a plurality of outputs, wherein the plurality of outputs are connected to corresponding oscillation inputs $12_{1B}$, $12_{2B}$, $12_{3B}$, ..., $12_{nB}$. In accordance with embodiments, error amplifier 16 comprises an operational amplifier 20 connected in a negative feedback configuration in which an impedance 22 is coupled between the output of operational amplifier 20 and its inverting input and an impedance 24 is connected to the inverting input of operational amplifier 20. By way of example, impedance 22 comprises a capacitor 26 coupled in parallel with a series connected resistor 28 and capacitor 30, and impedance 24 comprises a resistor. The non-inverting input of operational amplifier 20 is coupled for receiving a reference voltage level $V_{REF1}$. It should be understood that the feedback configuration of error amplifier 16 is not a limitation of the present invention and that it may be realized using other feedback configurations known to those skilled in the art.

Outputs $14_1$, $14_2$, $14_3$, ..., $14_n$ of PWM circuit 12 are connected to corresponding inputs of power stages $34_1$, $34_2$, $34_3$, ..., $34_n$, respectively. One output of power stage $34_1$ is connected to an output node 50. Similarly, outputs of power stages $34_2$, $34_3$, ..., $34_n$ are connected to output node 50. Power stages $34_1$, $34_2$, $34_3$, ..., $34_n$ have current sense modules $35_1$, $35_2$, $35_3$, ..., $35_n$, respectively, that generate feedback currents $I_{FEED1}$, $I_{FEED2}$, $I_{FEED3}$, ..., $I_{FEEDn}$ that are proportional to the currents flowing through energy storage elements $44_1$, $44_2$, $44_3$, ..., $44_n$. Feedback current signals $I_{FEED1}$, $I_{FEED2}$, $I_{FEED3}$, ..., $I_{FEEDn}$, are fed back to PWM circuit 12 through feedback interconnects $37_1$, $37_2$, $37_3$, ..., $37_n$, respectively. Circuit configurations for current sense modules are known to those skilled in the art.

Power stages $34_1$, $34_2$, $34_3$, ..., $34_n$ comprise driver circuits $54_1$, $54_2$, $54_3$, ..., $54_n$, respectively, having inputs that serve as the inputs of power stage $34_1$, $34_2$, $34_3$, ..., $34_n$, high-side driver outputs connected to the gates of the respective switching transistors $56_1$, $56_2$, $56_3$, ..., $56_n$, and low-side driver outputs connected to the gates of the respective switching transistors $58_1$, $58_2$, $58_3$, ..., $58_n$. The drains of high-side switching transistors $56_1$, $56_2$, $56_3$, ..., $56_n$ are coupled for receiving a source of operating potential such as, for example, $V_{CC}$, and the sources of high-side switching transistors $56_1$, $56_2$, $56_3$, ..., $56_n$ are connected to the respective drains of low-side switching transistors $58_1$, $58_2$, $58_3$, ..., $58_n$. The sources of low-side switching transistors $58_1$, $58_2$, $58_3$, ..., $58_n$ are coupled for receiving a source of operating potential such as, for example, $V_{SS}$. The commonly connected sources and drains of transistors $56_1$, $56_2$, $56_3$, ..., $56_n$ and transistors $58_1$, $58_2$, $58_3$, ..., $58_n$, respectively, are connected to a terminal of the respective energy storage elements $44_1$, $44_2$, $44_3$, ..., $44_n$. The other terminals of energy storage elements $44_1$, $44_2$, $44_3$, ..., $44_n$ serve as outputs of power stages $34_1$, $34_2$, $34_3$, ..., $34_n$. By way of example, energy storage elements $44_1$, $44_2$, $44_3$, ..., $44_n$ are inductors. It should be noted that for "n" equal to two, power converter 10 is a 2-phase power converter; for "n" equal to three, power converter 10 is a 3-phase power converter; for "n" equal to four, power converter 10 is a 4-phase power converter, etc.

Figure 2:
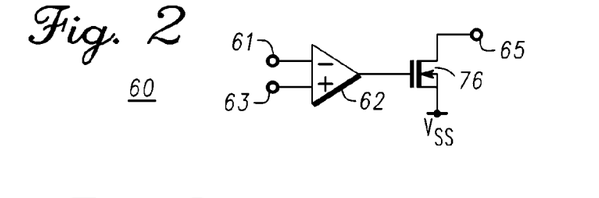
FIG. 2 is a schematic diagram of a portion of the multi-phase controller circuit of FIG. 1.

An oscillator control circuit 60 is coupled to input 32 of oscillator 18 via a resistor 59. More particularly, oscillator control circuit 60 has an input 61 connected to output 17 of error amplifier 16 for receiving compensation voltage $V_{COMP}$, an input 63 coupled for receiving a reference voltage $V_{REF2}$, and an output 65 connected to input 32 of oscillator 18. Briefly referring to FIG. 2, a schematic diagram of oscillator control circuit 60 in accordance with one embodiment of the present invention is illustrated. What is shown in FIG. 2 is a comparator 62 having an inverting input which serves as input 61 of oscillator control circuit 60, a non-inverting input which serves as input 63 of oscillator control circuit 60, and an output. Preferably, comparator 62 has hysteresis. The output of comparator 62 is connected to the gate of a Field Effect Transistor ("FET") 76. The source of FET 76 is coupled for receiving a source of operating potential such as, for example, $V_{SS}$, and the drain of FET 76 serves as an open drain output and as output 65 of oscillator control circuit 18.

A load 80 is coupled between output node 50 and a source of operating potential such as, for example, $V_{SS}$. An output capacitor 82 is connected in parallel with load 80. Output node 50 is connected in a feedback configuration to impedance 24.

In accordance with one embodiment, current imbalance and, therefore, thermal runaway is inhibited by adjusting the frequency of power converter 10 so that a load step period and the on-time of multi-phase power converter 10 are in a temporal relationship. It should be understood that the on-time of multi-phase power converter 10 is the time during which one or more of high side switching transistors $56_1$-$56_n$ is on. The temporal relationship is such that the load step period and the on-time of multi-phase power converter 10 is not coincident, the same, or similar with the load step current for an extended period of time. This is accomplished by programming oscillator 18 to generate a plurality of oscillator output signals having predetermined frequency and phase relationships. In accordance with one embodiment, power converter 10 is a 4-phase power converter, i.e., variable "n" is equal to 4, and oscillator 18 generates four triangular waveforms that are separated by 90 angular degrees. Oscillator 18 may be programmed by coupling a resistor 84 between input 32 of oscillator 18 and a source of operating potential, such as, for example, $V_{SS}$. The structure for controlling the output frequency of oscillator 18 is not limited to being a resistor. Other circuit networks can be coupled to input 32. For example, a resistor divider network may be coupled to input 32. Oscillator 18 transmits the oscillator output signals to inputs $12_{1B}$, $12_{2B}$, $12_{3B}$, ..., $12_{nB}$ of PWM circuit 12. It should be noted that when power converter 10 is a 2-phase power converter, oscillator 18 generates two triangular waveforms that are separated by 180 degrees; when power converter 10 is a 3-phase power converter, oscillator 18 generates three triangular waveforms that are separated by 120 degrees, when power converter 10 is an n-phase power converter, oscillator 18 generates "n" triangular waveforms that are separated by 360/n degrees. As discussed hereinbefore, power converter 10 can be a 2-phase power converter, a 3-phase power converter, a 4-phase power converter, a 5-phase power converter, etc. It should be further noted that the oscillator output signal is also referred to as a ramp signal.

In addition, error amplifier 16 transmits a compensation signal, $V_{COMP}$, to inputs $12_{1A}$, $12_{2A}$, $12_{3A}$, ..., $12_{nA}$ of PWM circuit 12. Compensation signal $V_{COMP}$ is also referred to as an error signal $V_{ERROR}$ and appears at output 17 of error amplifier 16.

Figure 3:
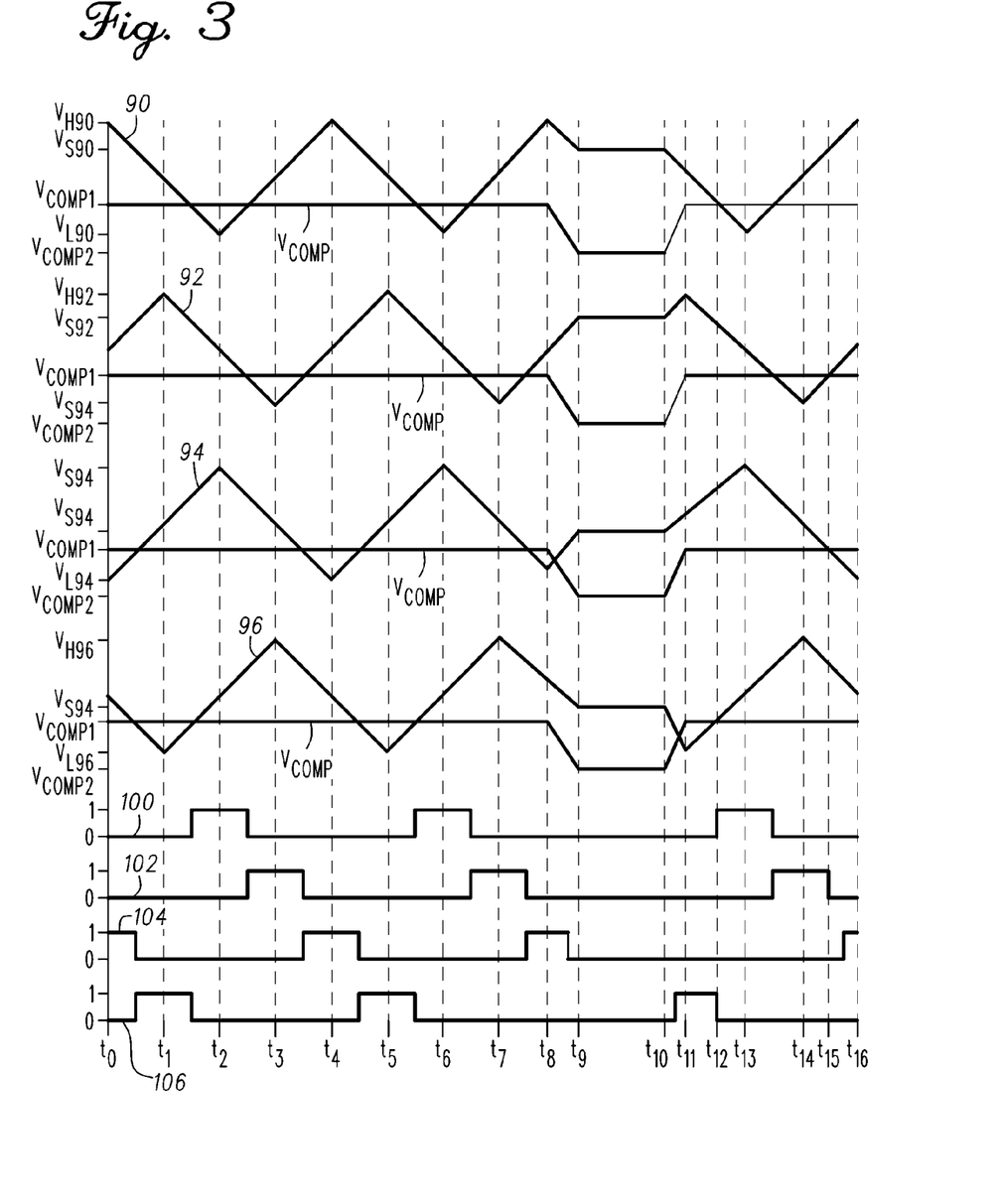
FIG. 3 is a timing diagram of the operation of the multi-phase controller circuit of FIG. 1.

Referring now to FIG. 3, a timing diagram illustrating the triangular waveforms or ramp signals generated by oscillator 18 for a 4-phase power converter is illustrated. What is shown in FIG. 3 is a triangular waveform 90 having an amplitude ranging from voltage level $V_{L90}$ to voltage level $V_{H90}$, a triangular waveform 92 having an amplitude ranging from voltage level $V_{L92}$ to voltage level $V_{H92}$, a triangular waveform 94 having an amplitude ranging from voltage level $V_{L94}$ to voltage level $V_{H94}$, and a triangular waveform 96 having an amplitude ranging from voltage level $V_{L96}$ to voltage level $V_{H96}$. Triangular waveforms 90 and 92 have phase angles that are separated by 90 angular degrees; triangular waveforms 92 and 94 have phase angles that are separated by 90 angular degrees; triangular waveforms 94 and 96 have phase angles that are separated by 90 angular degrees; and triangular waveforms 96 and 90 have phase angles that are separated by 90 angular degrees. During times $t_0$ to $t_8$, waveform 90 leads waveform 92 by 90 degrees, waveform 90 leads waveform 94 by 180 degrees, waveform 90 leads waveform 96 by 270 degrees, and compensation voltage $V_{COMP}$ has a substantially constant voltage value of $V_{COMP1}$. It should be noted that waveforms 90-96 have been shown as separate plots for the sake of clarity and that voltage level $V_{COMP1}$ is the same voltage level for each of the plots for waveforms 90-96.

When waveform 90 has a voltage value greater than voltage $V_{COMP}$, signal 100 appearing at output $14_1$ of PWM 12 has a logic low voltage level, i.e., a logic 0 level. When waveform 90 has a voltage value less than voltage $V_{COMP}$, signal 100 has a logic high voltage level, i.e., a logic 1 level. Similarly, when waveforms 92-96 have voltage values greater than voltage $V_{COMP}$, signals 102-106 appearing at outputs $14_2$-$14_n$ of PWM 12, respectively, have logic low voltage levels, i.e., logic 0 levels, and when waveforms 92-96 have voltage values less than voltage $V_{COMP}$, signals 102-106 appearing at outputs $14_2$-$14_n$ of PWM 12, respectively, have logic high voltage levels, i.e., logic 1 levels. Thus, signals 102-106 are generated by comparing compensation signal $V_{COMP}$ with waveforms 90-96, respectively.

At time $t_8$, load current $I_{LOAD}$ decreases which increases voltage $V_{OUT}$ and causes voltage $V_{COMP}$ to decrease from a voltage level $V_{COMP1}$ to a voltage level $V_{COMP2}$. PWM outputs $14_1$-$14_n$ are held low, i.e., the corresponding pulse width modulator circuits of PWM 12 are off when voltage signal $V_{COMP}$ is at voltage level $V_{COMP2}$. Because the corresponding pulse width modulators are off, waveforms 90-96 become non-time varying and have voltage levels $V_{S90}$, $V_{S92}$, $V_{S94}$, and $V_{S96}$, respectively. Therefore oscillator output signals 90-96 are suspended. Thus, a phase shift angle is introduced into waveforms 90-96. In other words, the time during which they are suspended merely introduces a delay into waveforms 90-96. Thus, at time $t_8$ waveform 90 begins to decrease from voltage level $V_{H90}$. However, at time $t_9$, waveform 90 is suspended at a voltage level $V_{S90}$ and remains at this voltage level until time $t_{10}$ at which time it continues decreasing to voltage level $V_{L90}$. Similarly, at time $t_9$, waveform 92 is suspended at a voltage level $V_{S92}$ and remains at this voltage level until time $t_{10}$ at which time it continues increasing to voltage level $V_{H92}$; waveform 94 is suspended at a voltage level $V_{S94}$ and remains at this voltage level until time $t_{10}$ at which time it continues increasing to voltage level $V_{H94}$; and waveform 96 is suspended at a voltage level $V_{S96}$ and remains at this voltage level until time $t_{10}$ at which time it continues decreasing to voltage level $V_{L96}$. While waveforms 90-96 are suspended, PWM signals 100-106 have a zero duty cycle, i.e., they are at logic low or logic 0 voltage levels.

It should be noted that like voltage level $V_{COMP1}$, voltage level $V_{COMP2}$ is the same for each waveform 90-96. Voltage levels $V_{H90}$, $V_{H92}$, $V_{H94}$, and $V_{H96}$ may be the same and voltage levels $V_{L90}$, $V_{L92}$, $V_{L94}$, and $V_{L96}$ are the same.

At time $t_{10}$, output voltage $V_{OUT}$ begins to recover causing compensation voltage $V_{COMP}$ appearing at output 17 of error amplifier 16 to increase. At time $t_{11}$, output voltage level $V_{OUT}$ has recovered and compensation voltage $V_{COMP}$ appearing at output 17 of error amplifier 16 is at voltage level $V_{COMP1}$. Thus, waveforms 90-96 continue from where they were suspended. During the time period between times $t_{10}$ and $t_{15}$, signals 100-106 appearing at outputs $14_1$-$14_n$ of PWM 12 are at a logic low voltage level when waveforms 90-96 have voltage values greater than compensation voltage $V_{COMP}$ and they are at a logic high voltage level when waveforms 90-96 have voltage values less than compensation voltage $V_{COMP}$.

Figure 4:
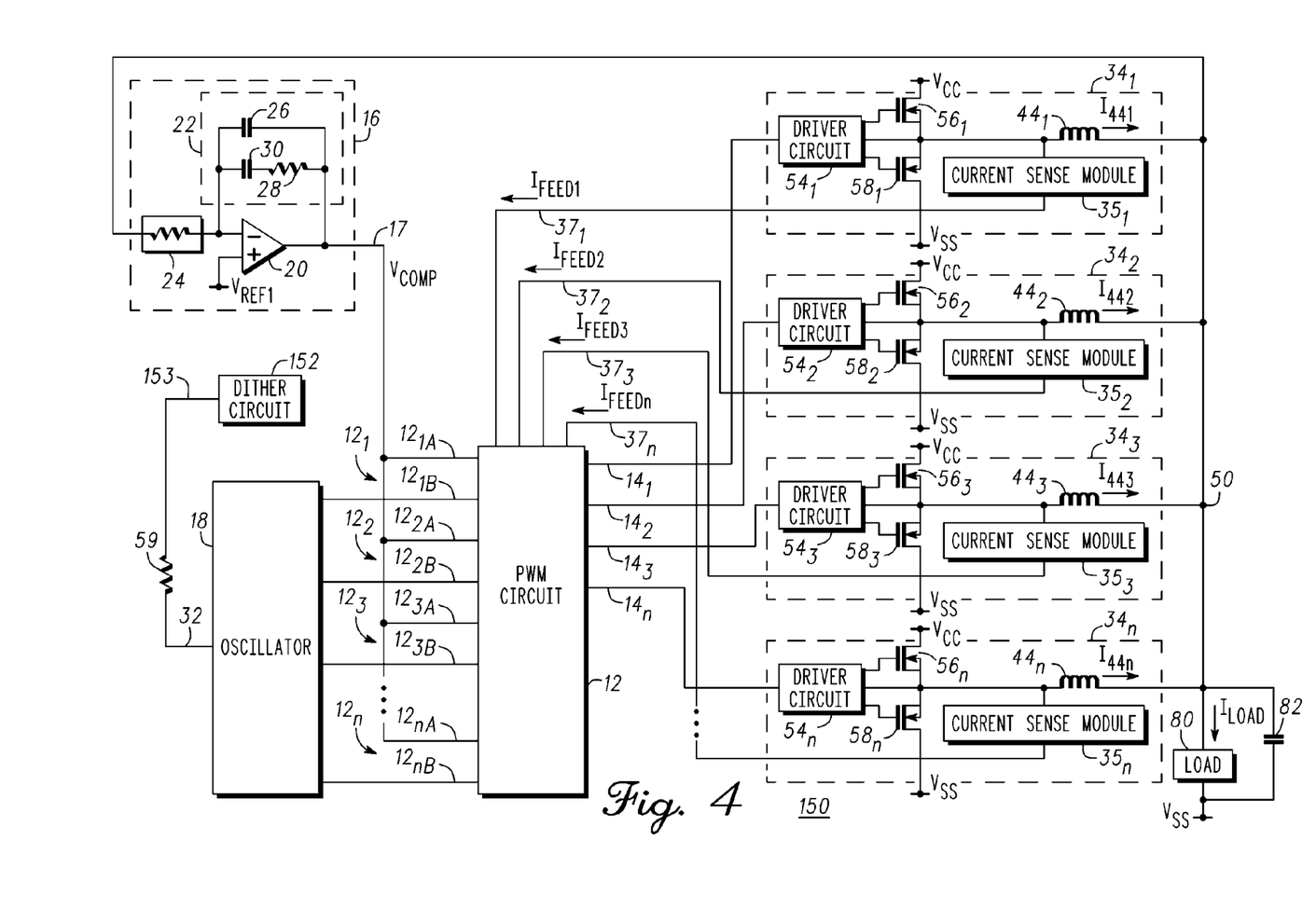
FIG. 4 is a schematic diagram of a multi-phase controller circuit in accordance with another embodiment of the present invention.

FIG. 4 is a block diagram of a multi-phase power converter 150 in accordance with another embodiment of the present invention. What is shown in FIG. 4 is PWM circuit 12, error amplifier 16, oscillator 18, power stages $34_1$-$34_n$, load 80, and load capacitor 82, which have been described with reference to FIG. 2. Multi-phase power converter 150 further includes a dither network 152 having an output 153 coupled to input 32 of oscillator 18 via resistor 59.

Figure 5:
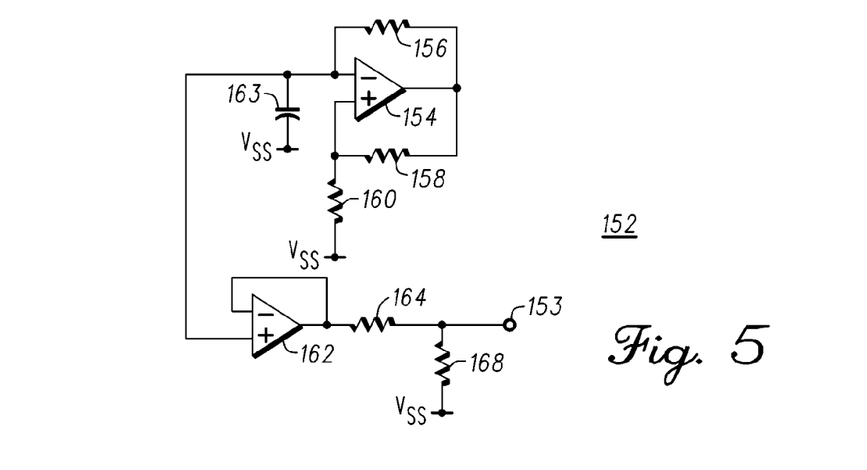
FIG. 5 is a schematic diagram of a portion of the multi-phase controller circuit of FIG. 4.

FIG. 5 is a block diagram of dither network 152 in accordance with an embodiment of the present invention. Dither network 152 may comprise operational amplifiers 154 and 162, wherein each operational amplifier has an inverting input, a non-inverting input, and an output. A resistor 156 is connected between the output of operational amplifier 154 and its inverting input and a resistor 158 is connected between the output of operational amplifier 154 and its non-inverting input. In addition, a resistor 160 is connected between the non-inverting input of operational amplifier 154 and a source of operating potential such as, for example, $V_{SS}$, and a capacitor 163 is connected between the inverting input of operational amplifier 154 and a source of operating potential such as, for example, $V_{SS}$. The non-inverting input of operational amplifier 162 is connected to the inverting input of operational amplifier 154 and the output of operational amplifier 162 is connected to its inverting input in a unity gain configuration. The output of operational amplifier 162 is also connected to output 153 through a resistor 164. Output 153 is coupled for receiving a source of operating potential such as, for example, $V_{SS}$, through a resistor 168.

In operation, dither circuit 152 changes the switching frequency of power stages $34_1$-$34_n$ to inhibit the load step rate and the switching frequency of switches $34_1$-$34_n$ from matching for a significant period of time. This prevents a build-up of an imbalance of current in the channels.

Figure 6:
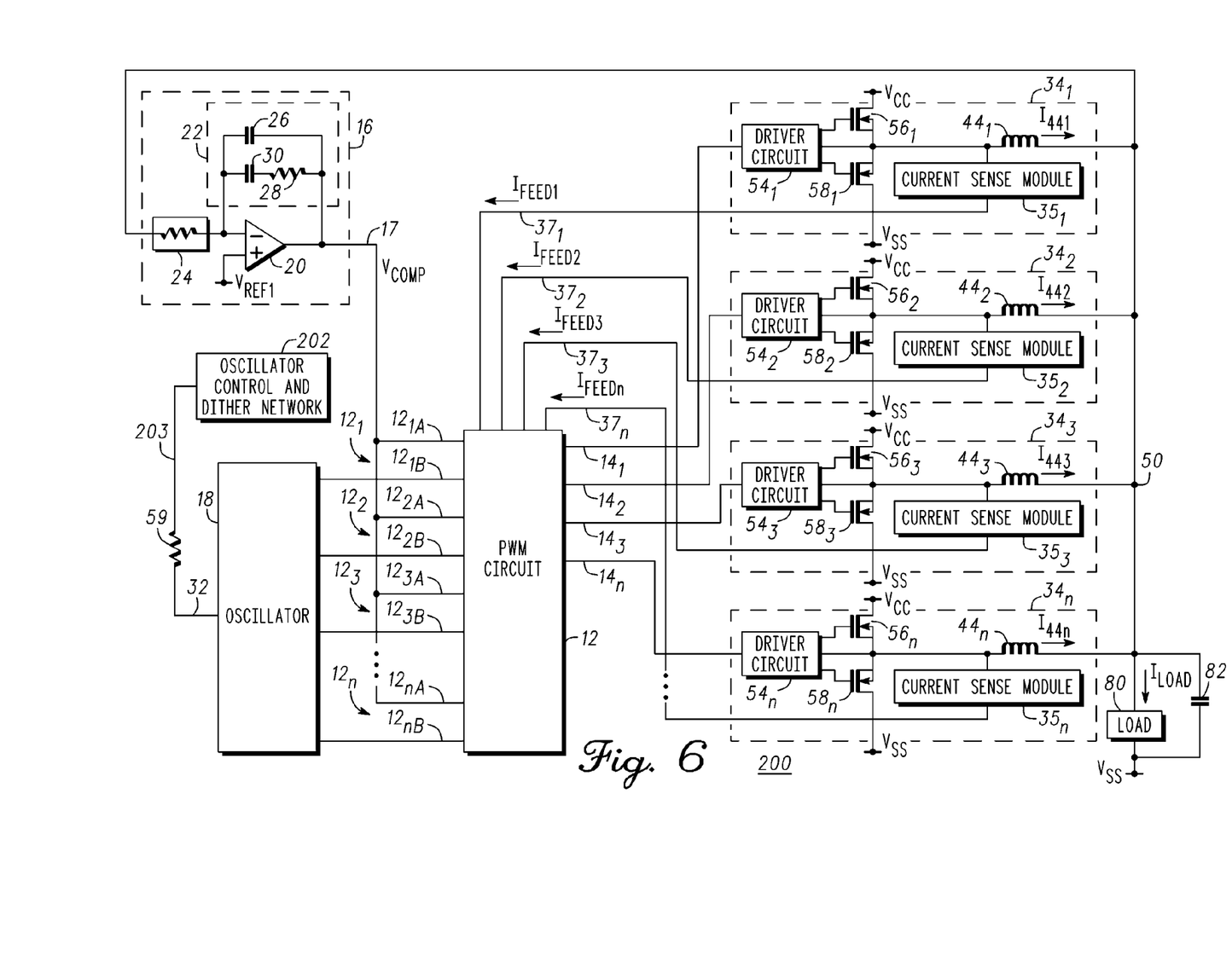
FIG. 6 is a schematic diagram of a multi-phase controller circuit in accordance with yet another embodiment of the present invention.

FIG. 6 is a block diagram of a multi-phase power converter 200 in accordance with another embodiment of the present invention. What is shown in FIG. 6 is PWM circuit 12, error amplifier 16, oscillator 18, power stages $34_1$-$34_n$, load 80, and load capacitor 82, which have been described with reference to FIGS. 2 and 4. Multi-phase power converter 200 further includes an oscillator control and dither network 202 having an output 203 coupled to input 32 of oscillator 18 through resistor 59.

In operation, oscillator control and dither network 202 changes the switching frequency of power stages $34_1$-$34_n$ and introduces a phase delay to inhibit the load step rate and the switching frequency of switches $34_1$-$34_n$ from matching for a significant period of time. This prevents a build-up of an imbalance of current in the channels, thereby inhibiting thermal runaway and thus thermal failure of multi-phase power converter 200.

Figure 7:
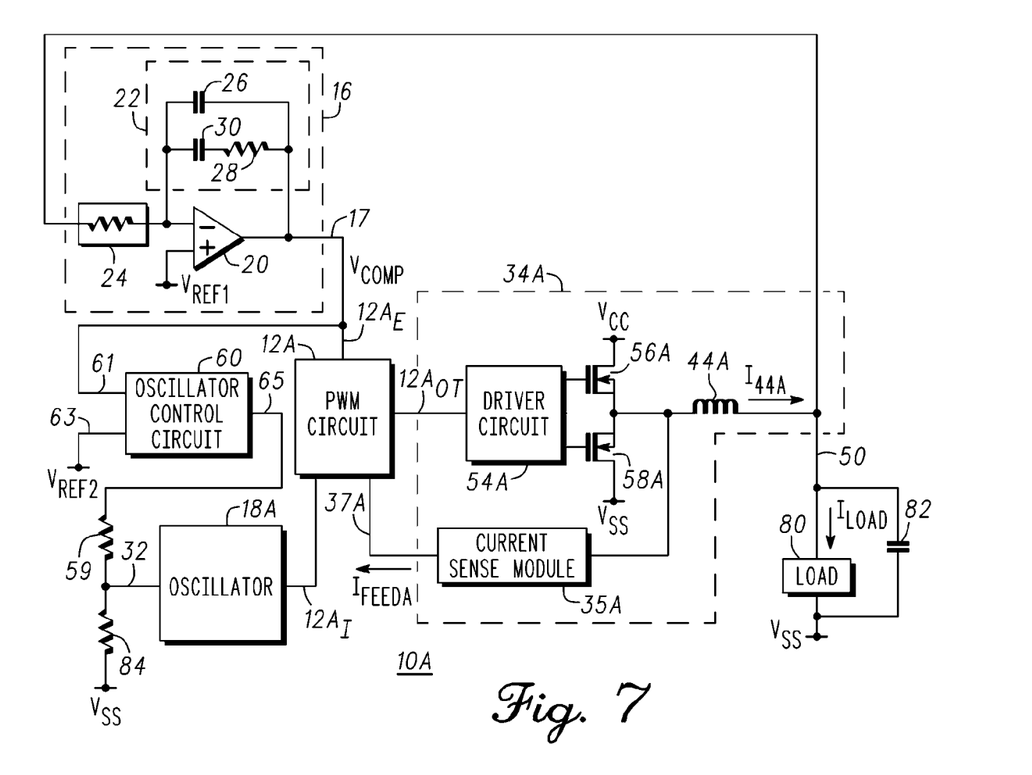
FIG. 7 is a schematic diagram of a single phase controller circuit in accordance with another embodiment of the present invention.

FIG. 7 is a block diagram of a single phase power converter 10A manufactured in a semiconductor substrate in accordance with an embodiment of the present invention. What is shown in FIG. 7 is a Pulse Width Modulator ("PWM") circuit 12A having an oscillator signal input $12A_I$, an error signal input $12A_E$, and an output $12A_O$. Single phase power converter 10A further includes error amplifier 16 having output 17 connected to error signal input 12A$_E$ and an oscillator 18A having input 32 and an output connected to an input 12$_I$ of PWM circuit 12A Error amplifier 16 has been described with reference to FIG. 1. It should be noted that the reference character "A" has been appended to reference characters 10, 12, 14, 18, 34, 35, 54, 56, and 58 to distinguish them from elements having a similar function in the multi-phase power converter embodiments.

Output 12A$_{OT}$ of PWM circuit 12A is connected to the input of a power stage 34A. Power stage 34A is similar to power stages 34$_1$-34$_n$ which were described with reference to FIG. 1. One output of power stage 34A is connected to output node 50. A current sense module 35A is coupled to power stage 34A and generates a feedback current I$_{FEEDA}$ that is proportional to the current flowing through energy storage element 44A. Feedback current signal I$_{FEEDA}$ is fed back to PWM circuit 12A through feedback interconnects 37A. Circuit configurations for current sense modules are known to those skilled in the art. It should be understood that current sense module 35A is an optional circuit feature that may be omitted.

Power stage 34A comprises a driver circuit 54A having an input that serves as the input of power stage 34A, a high-side driver output connected to the gate switching transistor 56A, and a low-side driver output connected to the gate of the transistor 58A. The drain of high-side switching transistors 56A is coupled for receiving a source of operating potential such as, for example, V$_{CC}$, and the source of high-side switching transistor 56A is connected to the drain of low-side switching transistor 58A. The source of low-side switching transistor 58A is coupled for receiving a source of operating potential such as, for example, V$_{SS}$. The commonly connected source and drain of transistor 56A and transistor 58A is connected to a terminal of energy storage element 44A. The other terminal of energy storage element 44A serves as an output of power stage 34A. By way of example, energy storage element 44A is an inductor.

An oscillator control circuit 60 is coupled to input 32 of oscillator 18 via a resistor 59. More particularly, oscillator control circuit 60 has an input 61 connected to output 17 of error amplifier 16 for receiving compensation voltage V$_{COMP}$, an input 63 coupled for receiving a reference voltage V$_{REF2}$, and an output 65 coupled to input 32 of oscillator 18 through resistor 59. FIG. 2 illustrates a circuit schematic of an embodiment of an oscillator control circuit 60.

A load 80 is coupled between output node 50 and a source of operating potential such as, for example, V$_{SS}$. An output capacitor 82 is connected in parallel with load 80. Output node 50 is connected in a feedback configuration to impedance 24. An output voltage signal from output node 50 is fed back to error amplifier 16 which generates a compensation signal V$_{COMP}$.

In accordance with an embodiment, aliasing effects are mitigated by adjusting the frequency of power converter 10A so that a load step period and the on-time of single phase power converter 10A are in a temporal relationship. It should be understood that the on-time of single phase power converter 10A is the time during which high side switching transistor 56A is on. The temporal relationship is such that the load step period and the on-time of single phase power converter 10A are not coincident, the same, or similar with the load step current for an extended period of time. Oscillator 18A may be programmed by coupling a resistor 84 between input 32 of oscillator 18A and a source of operating potential, such as, for example, V$_{SS}$. The structure for controlling an output frequency of oscillator 18A is not limited to being a resistor. Other circuit networks can be coupled to input 32. For example, a resistor divider network may be coupled to input 32. Oscillator 18A transmits an oscillator output signal to input 12A$_I$ of PWM circuit 12A. It should be further noted that the oscillator output signal may be a ramp signal.

In addition, error amplifier 16 transmits a compensation signal, V$_{COMP}$, to input 12A$_I$ of PWM circuit 12A. Compensation signal V$_{COMP}$ is also referred to as an error signal V$_{ERROR}$ and appears at output 17 of error amplifier 16.

Figure 8:
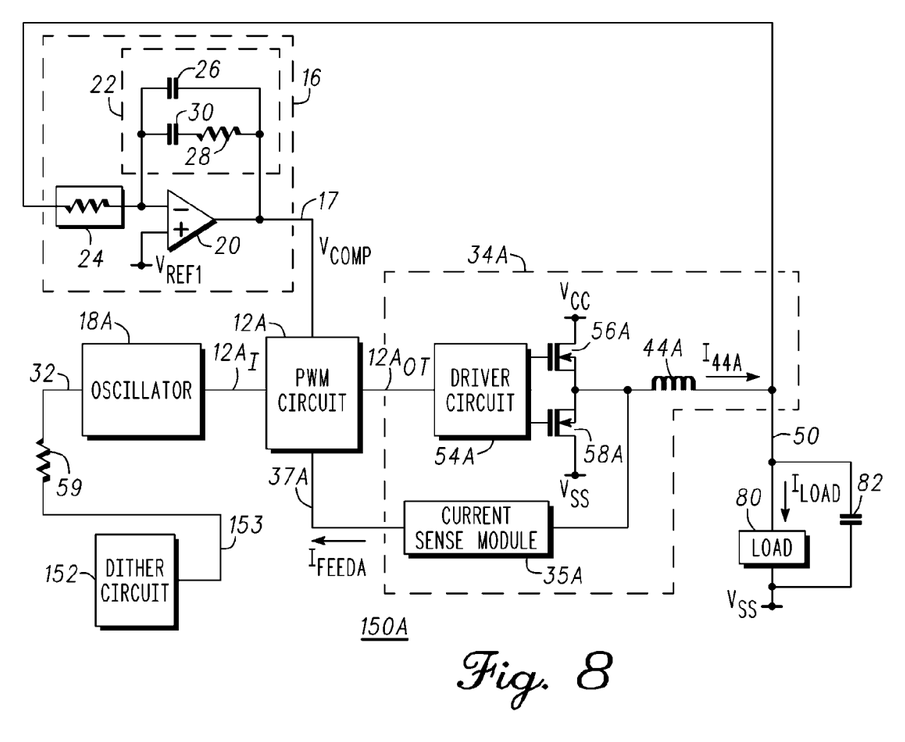
FIG. 8 is a schematic diagram of a single phase controller circuit in accordance with another embodiment of the present invention.

FIG. 8 is a block diagram of a single phase power converter 150A in accordance with another embodiment of the present invention. What is shown in FIG. 8 is PWM circuit 12A, error amplifier 16, oscillator 18A, power stage 34A, load 80, and load capacitor 82, which have been described with reference to FIG. 7. Single phase power converter 150A further includes a dither network 152 having an output 153 coupled to input 32 of oscillator 18A via resistor 59. FIG. 5 is a block diagram of dither network 152 in accordance with an embodiment of the present invention.

In operation, dither circuit 152 changes the switching frequency of power stage 34A to inhibit the load step rate and the switching frequency of switch 34A from matching for a significant period of time. This mitigates the effects of aliasing on the converter output voltage.

Figure 9:
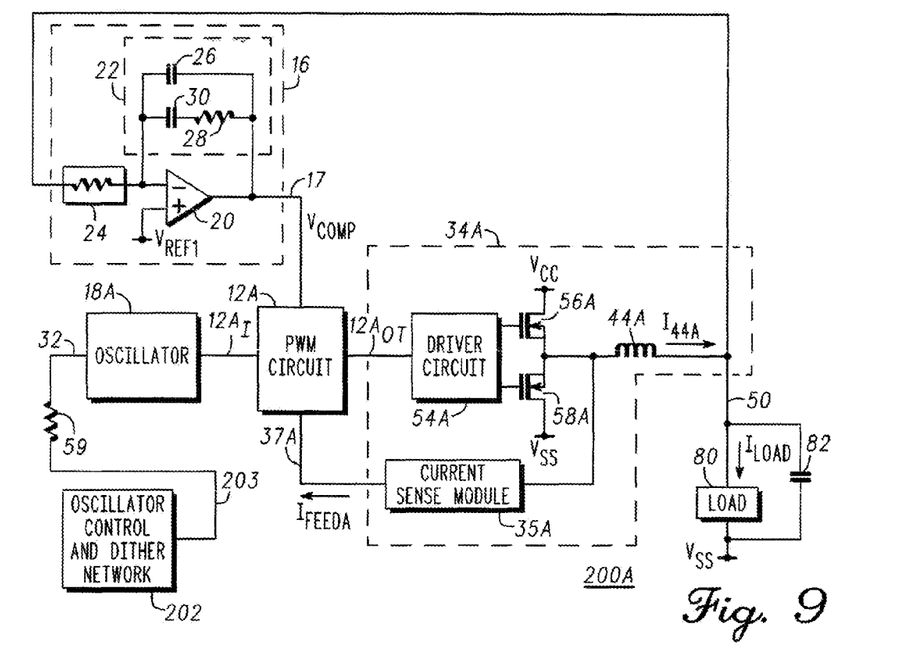
FIG. 9 is a schematic diagram of a single phase controller circuit in accordance with another embodiment of the present invention.

FIG. 9 is a block diagram of a single phase power converter 200A in accordance with another embodiment of the present invention. What is shown in FIG. 9 is PWM circuit 12A, error amplifier 16, oscillator 18A, power stage 34A, and load capacitor 82, which have been described with reference to FIG. 7. Single phase power converter 200A further includes oscillator control and dither network 202 having an output 203 coupled to input 32 of oscillator 18A through resistor 59.

In operation, oscillator control and dither network 202 changes the switching frequency of power stage 34A and introduces a phase delay to inhibit the load step rate and the switching frequency of switch 34A from matching for a significant period of time. This prevents a build-up of an imbalance of current in the channel, thereby mitigating the effects of aliasing on the converter output voltage.

By now it should be appreciated that a method of mitigating aliasing effects in single phase and multi-phase power converters and balancing current between phases of a multi-phase power converter for inhibiting thermal run-away at varying load transition rates has been provided. In accordance with an embodiment of the present invention, thermal run-away is inhibited by adjusting the frequency or period of single phase and multi-phase power converters and a load step period such that they are not coincident, the same, or similar for an extended period of time. In accordance with another embodiment, thermal run-away is inhibited by dithering the switching frequency of power stages so that the load step rate and the switching frequency of the switches do not match for a significant period of time. An advantage of the present invention is that it is cost efficient to implement.

Figure 10:
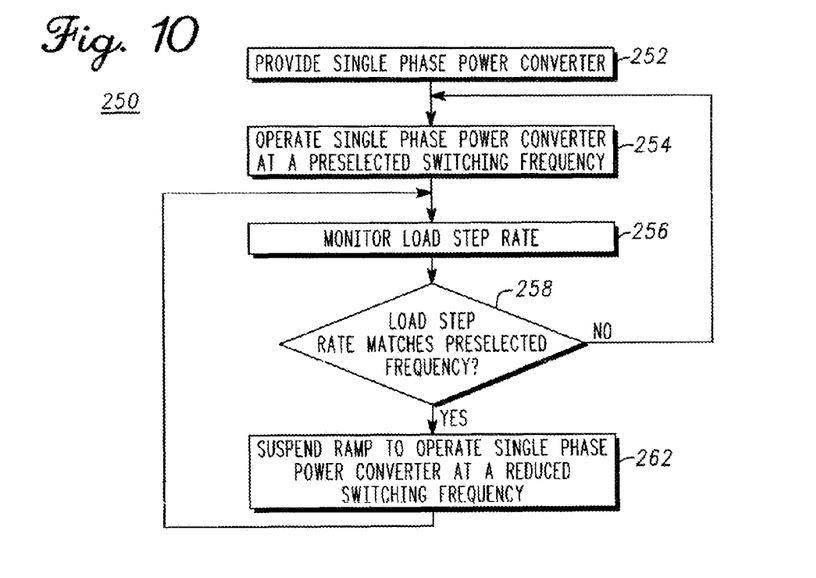
FIG. 10 is a flow diagram illustrating operation of a single phase power converter in accordance with an embodiment of the present invention.

FIG. 10 is a flow diagram 250 of a method for decreasing a voltage perturbation at an output of a single phase power converter in response to a load current perturbation in a single phase power converter at varying repetition rates of load transitions in accordance with an embodiment of the present invention. A single phase power converter is provided as indicated by box 252. In operation, the single phase power converter is configured to operate at a preselected frequency as indicated by box 254. A load step rate at the output is monitored as indicated by box 256. If the load step rate does not match or does not substantially match the preselected frequency, a ramp signal from a ramp signal generator is not suspended and operation of the single phase power converter is transferred back to box 254 (indicated by decision diamond 258). In response to the load step rate matching or substantially matching the preselected frequency, the ramp signal from the ramp signal generator is momentarily suspended to inhibit matching of the load step rate and the switching frequency of the single phase power converter as indicated by box 262.

Although specific embodiments have been disclosed herein, it is not intended that the invention be limited to the disclosed embodiments. Those skilled in the art will recognize that modifications and variations can be made without departing from the spirit of the invention. For example, the present invention is not limited to embodiments including pixels. It is intended that the invention encompass all such modifications and variations as fall within the scope of the appended claims.

What is claimed is:

1. A method for decreasing a voltage perturbation at an output of a single phase power converter in response to a load current perturbation in the single phase power converter at varying repetition rates of load transitions, comprising:
   providing the single phase power converter comprising:
      a pulse width modulation circuit having first and second inputs and an output;
      a ramp signal generator having an input and an output, the output of the ramp signal generator coupled to the second input of the pulse width modulation circuit; and
      a first power stage having an input coupled to an output of the pulse width modulation circuit;
   operating the single phase power converter to inhibit a load step rate and a switching frequency of the single phase power converter from matching for a significant period of time, wherein operating the single phase power converter includes dithering an output signal of the single phase power converter, and wherein operating the single phase power converter to inhibit a load step rate and a switching frequency from matching for a significant period of time includes programming the ramp signal generator to generate an output signal having a predetermined frequency and adjusting an output frequency of the single phase power converter so that a load step period and an on-time of the single phase power converter are in a changing temporal relationship.

2. The method of claim 1, wherein operating the single phase power converter further includes suspending a ramp signal.

3. The method of claim 1, further including:
   generating a circuit output voltage signal from a single phase power converter output voltage; and
   generating a compensation voltage from the circuit output voltage signal.

4. The method of claim 3, further including comparing the compensation voltage with a ramp signal to generate a pulse width modulated signal.

5. A method for decreasing a voltage perturbation at an output of a single phase power converter in response to a load current perturbation in the single phase power converter at varying repetition rates of load transitions, comprising:
   providing the single phase power converter comprising:
      a pulse width modulation circuit having first and second inputs and an output;
      a ramp signal generator having an input and an output, the output of the ramp signal generator coupled to the second input of the pulse width modulation circuit; and
      a first power stage having an input coupled to an output of the pulse width modulation circuit;
   operating the single phase power converter to inhibit a load step rate and a switching frequency of the single phase power converter from matching for a significant period of time, wherein operating the single phase power converter includes suspending a ramp signal, and wherein operating the single phase power converter to inhibit a load step rate and a switching frequency from matching for a significant period of time includes programming the ramp signal generator to generate an output signal having a predetermined frequency and adjusting an output frequency of the single phase power converter so that a load step period and an on-time of the single phase power converter are in a changing temporal relationship.

* * * * *